US012710795B2

(12) United States Patent
Togashi

(10) Patent No.: US 12,710,795 B2
(45) Date of Patent: Aug. 18, 2026

(54) FOLDABLE DISPLAY

(71) Applicant: Sharp Display Technology Corporation, Kameyama City (JP)

(72) Inventor: Yasuyuki Togashi, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 95 days.

(21) Appl. No.: 18/867,428

(22) PCT Filed: Jul. 12, 2022

(86) PCT No.: PCT/JP2022/027394

§ 371 (c)(1),
(2) Date: Nov. 19, 2024

(87) PCT Pub. No.: WO2024/013844

PCT Pub. Date: Jan. 18, 2024

(65) Prior Publication Data

US 2025/0370514 A1 Dec. 4, 2025

(51) Int. Cl.
*G06F 1/16* (2006.01)
*H05K 5/00* (2025.01)
*H05K 7/00* (2006.01)

(52) U.S. Cl.
CPC .......... *G06F 1/1681* (2013.01); *G06F 1/1652* (2013.01)

(58) Field of Classification Search
CPC ............................ G06F 1/1681; G06F 1/1652
See application file for complete search history.

(56) References Cited

U.S. PATENT DOCUMENTS 10,761,574 B1 * 9/2020 Hsu ....................... G06F 1/1616
11,385,687 B1 * 7/2022 Kim ...................... G06F 1/1616
12,032,417 B2 * 7/2024 Park .......................... G06F 1/16
2014/0226275 A1 8/2014 Ko et al.
2017/0060188 A1 3/2017 Han et al.
2020/0409422 A1 * 12/2020 Wang .................... F16C 11/045
2023/0081984 A1 * 3/2023 Lee ...................... H05K 5/0226 361/807
2023/0143511 A1 * 5/2023 Xi ......................... G06F 1/1681 361/679.27
2023/0213983 A1 * 7/2023 Yun ....................... G06F 1/1652 361/679.27
2024/0183383 A1 * 6/2024 Ying-Hsing ............ F16C 11/04
2025/0120026 A1 * 4/2025 Hale ....................... E05D 3/122

FOREIGN PATENT DOCUMENTS

JP 2014-161009 A 9/2014

* cited by examiner

*Primary Examiner* — Anthony M Haughton
(74) *Attorney, Agent, or Firm* — ScienBiziP, P.C.

(57) ABSTRACT

In a foldable display, a third portion, in a side view thereof, includes a first arc portion, a first line segment portion, and a second line segment portion in a first posture, and includes a second arc portion in a second posture.

14 Claims, 10 Drawing Sheets

FOLDABLE DISPLAY

TECHNICAL FIELD

The disclosure relates to a foldable display.

BACKGROUND ART

Advances have been made in the development of a foldable display capable of accommodating both the bending of a display panel, bringing the display panel inside a housing, and the bending of the display panel, bringing the display panel outside the housing (refer to PTL 1).

CITATION LIST

Patent Literature

PTL 1: JP 2014-161009 A

SUMMARY

Technical Problem

In the related art, there is a problem in that a bending stress applied to the display panel is significant.

Solution to Problem

A foldable display according to an aspect of the disclosure includes a housing unit including a first housing, a second housing, and a hinge portion coupling the first housing and the second housing, and a display panel having flexibility and including a first portion fixed to the first housing, a second portion fixed to the second housing, and a third portion positioned between the first portion and the second portion. The third portion includes, in a side view, in a first posture of the display panel being bent, bringing the display panel inside the housing unit, a first arc portion that is an arc of a first semicircle formed by a bent portion of the display panel, and a first line segment portion and a second line segment portion respectively starting from one end and the other end of the first arc portion, and, in a second posture of the display panel being bent, bringing the display panel outside the housing unit, a second arc portion that is an arc of a second semicircle formed by a bent portion of the display panel and having a radius greater than a radius of the first semicircle.

Advantageous Effects of Disclosure

According to an aspect of the disclosure, a bending stress applied to a display panel can be reduced.

DESCRIPTION OF EMBODIMENTS

Figure 1:
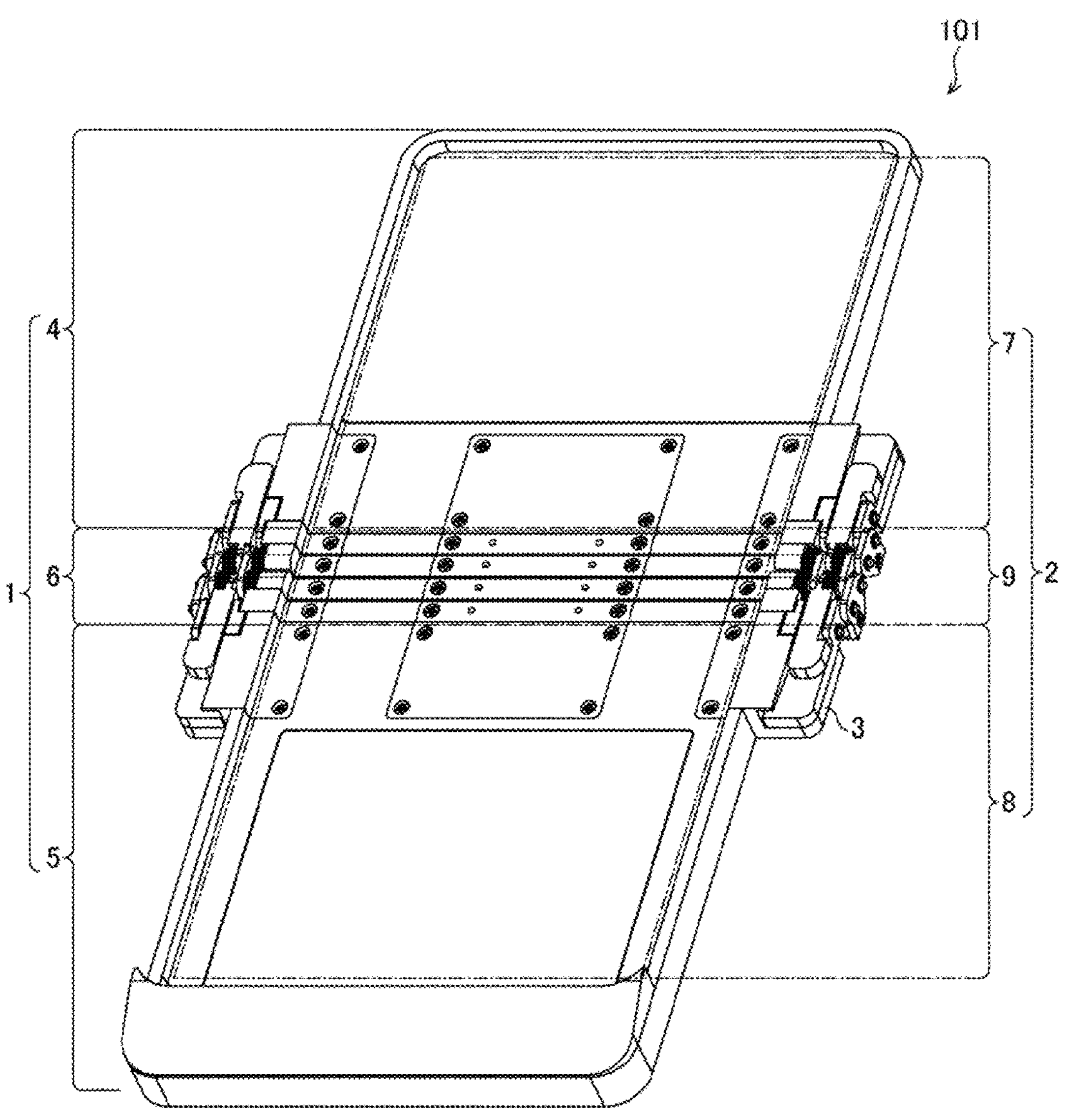
FIG. 1 is a perspective view illustrating a schematic configuration of a foldable display according to the disclosure.

Embodiments of the disclosure will now be described. For convenience of description, members having the same functions as the members described earlier may be denoted by the same reference numerals and signs, and the description thereof will not be repeated.

FIG. 1 is a perspective view illustrating a schematic configuration of a foldable display 101 according to the disclosure. The foldable display 101 includes a housing unit 1, a display panel 2 having flexibility, and a bearing assembly 3. In FIG. 1, to illustrate a portion of the housing unit 1 that faces the display panel 2, the housing unit 1 is illustrated as transparent relative to the display panel 2.

The housing unit 1 includes a first housing 4, a second housing 5, and a hinge portion 6 coupling the first housing 4 and the second housing 5.

The display panel 2 includes a first portion 7 fixed to the first housing 4, a second portion 8 fixed to the second housing 5, and a third portion 9 positioned between the first portion 7 and the second portion 8. The third portion 9 is not directly fixed to the housing unit 1, but indirectly fixed to the housing unit 1. Specifically, in the display panel 2, the first portion 7 is bonded to the first housing 4, the second portion 8 is bonded to the second housing 5, and the third portion 9 is not bonded to any part of the housing unit 1. Although the third portion 9 itself is not directly fixed to the housing unit 1, the third portion 9 being integrated with the first portion 7 and the second portion 8 that are directly fixed to the housing unit 1 can be interpreted as "the third portion 9 being indirectly fixed to the housing unit 1." The display panel 2 has flexibility, and examples thereof include an organic light-emitting diode (OLED) display panel and a quantum dot light-emitting diode (QLED) display panel.

The foldable display 101 can take on a first posture, a second posture, and a third posture. The first posture is a posture in which the display panel 2 is bent, bringing the display panel 2 inside the housing unit 1. The second posture is a posture in which the display panel 2 is bent, bringing the display panel 2 outside the housing unit 1. The third posture is a posture in which the display panel 2 is not bent.

Figure 2:
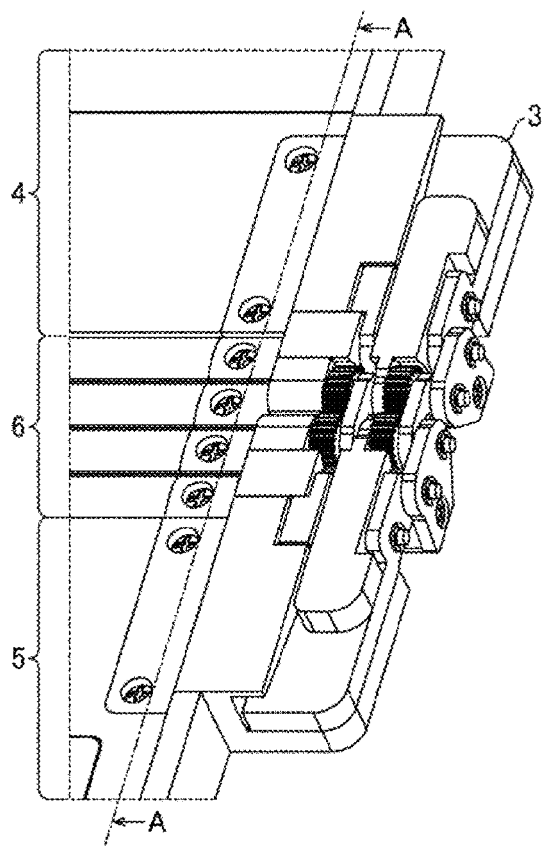
FIG. 2 is a perspective view of a bearing assembly and the vicinity thereof of the foldable display according to the disclosure.
Figure 3:
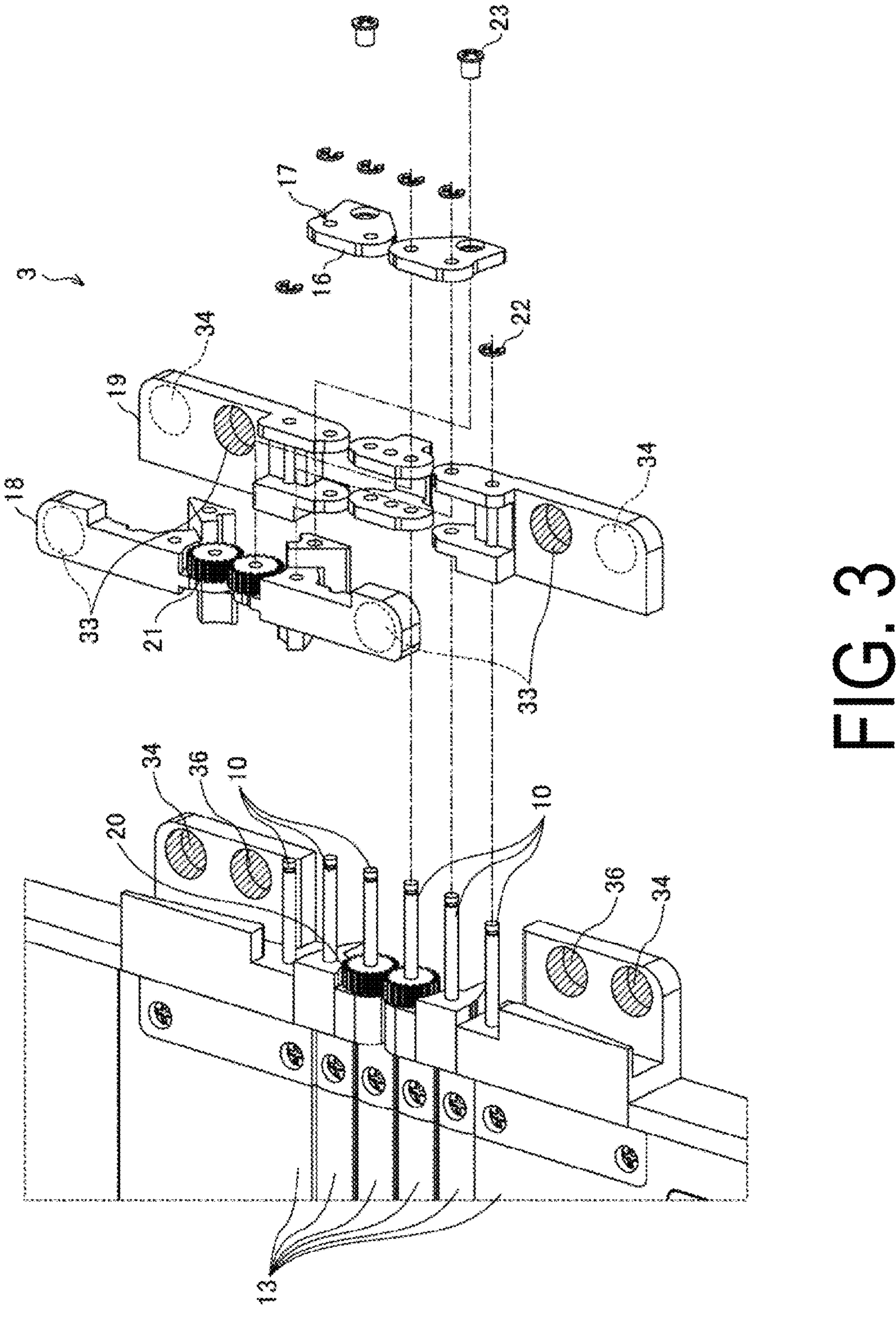
FIG. 3 is an exploded view of FIG. 2.
Figure 4:
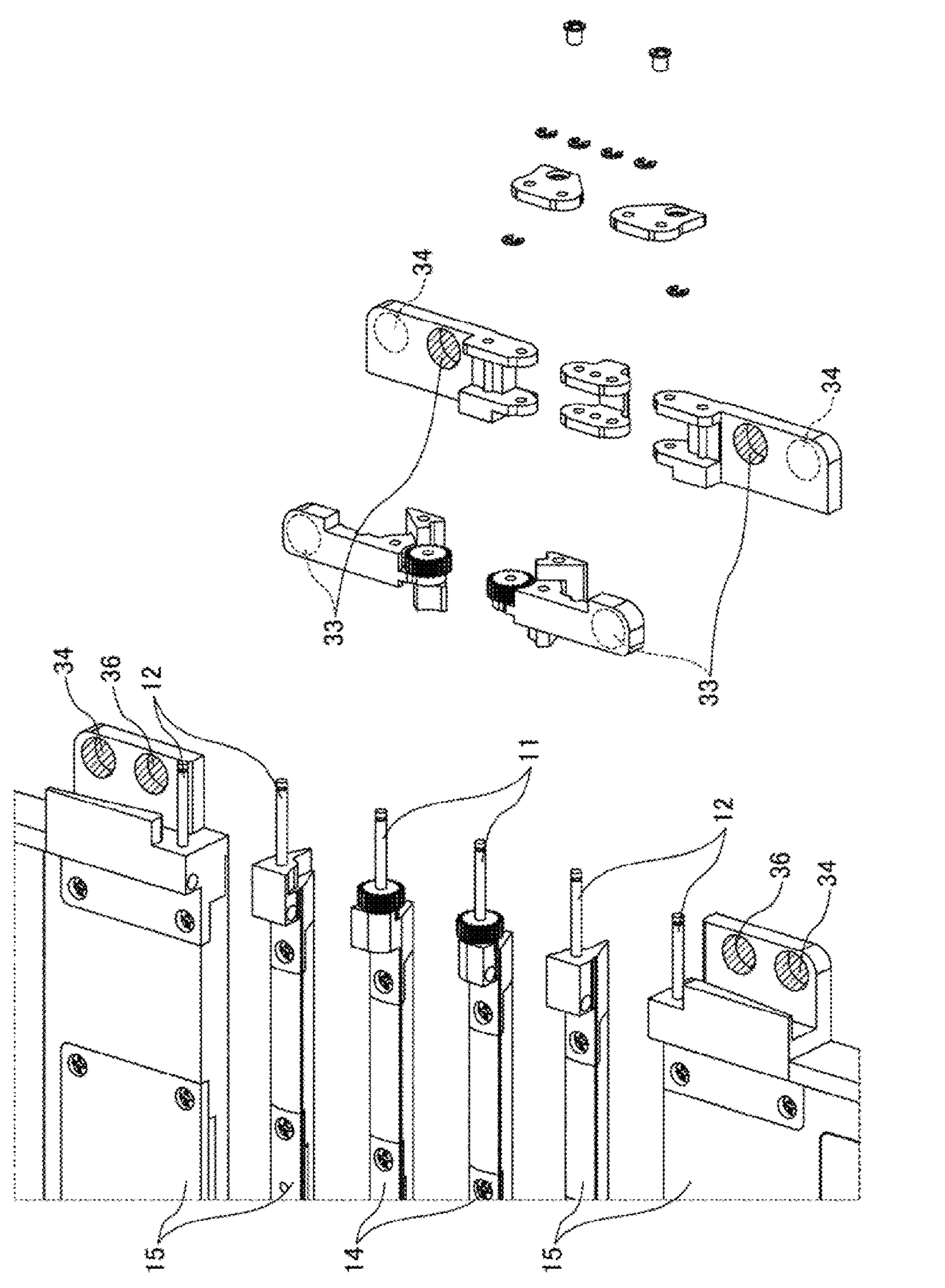
FIG. 4 is another exploded view of FIG. 2.

FIG. 2 is a perspective view of the bearing assembly 3 and the vicinity thereof of the foldable display 101. FIG. 3 is an exploded view of FIG. 2. FIG. 4 is another exploded view of FIG. 2. In each of FIG. 2 to FIG. 4, the display panel 2 is omitted for the sake of brevity of illustration.

At least the hinge portion 6 of the housing unit 1 includes a plurality of rotating shafts 10 for bending the display panel 2. According to FIG. 3 and FIG. 4, the hinge portion 6 includes four rotating shafts 10, and each of the first housing 4 and the second housing 5 includes one rotating shaft 10. In the present embodiment, the total number of the rotating shafts 10 is six. The total number of the rotating shafts 10 is not limited to six, and may be five or less or seven or more.

The plurality of rotating shafts 10 includes a first rotating shaft 11 and a second rotating shaft 12. The first rotating shaft 11 contributes to both the bending of the display panel 2 in the first posture and the bending of the display panel 2 in the second posture. The second rotating shaft 12 does not contribute to the bending of the display panel 2 in the first posture and contributes to the bending of the display panel 2 in the second posture.

At least the hinge portion 6 of the housing unit 1 includes a plurality of rotating shaft accommodation members 13, each respectively accommodating one of the plurality of rotating shafts 10. According to FIG. 3 and FIG. 4, the hinge portion 6 includes four rotating shaft accommodation members 13, and each of the first housing 4 and the second housing 5 includes one rotating shaft accommodation member 13. In the present embodiment, the total number of the rotating shaft accommodation members 13 is six. The total number of the rotating shaft accommodation members 13 is not limited to six, and may be five or less or seven or more.

The plurality of rotating shaft accommodation members 13 includes a first rotating shaft accommodation member 14 and a second rotating shaft accommodation member 15. The first rotating shaft accommodation member 14 accommodates the first rotating shaft 11. The second rotating shaft accommodation member 15 accommodates the second rotating shaft 12.

The bearing assembly 3 supports the plurality of rotating shafts 10. The bearing assembly 3 includes a bearing structure 16 that fixes relative positions of two of the plurality of rotating shafts 10 adjacent to each other. Two holes 17 are formed in the bearing structure 16. The bearing structure 16 fixes relative positions of two of the plurality of rotating shafts 10 adjacent to each other by insertion of the two of the plurality of rotating shafts 10 adjacent to each other into the two holes 17. The bearing assembly 3 includes a plurality of the bearing structures 16.

The bearing assembly 3 includes a first blade portion (first area) 18 and a second blade portion (second area) 19. The first blade portion 18 is rotatable about the first rotating shaft 11. The second blade portion 19 is rotatable about the second rotating shaft 12. Two first blade portions 18 and two second blade portions 19 (one pair each) are provided symmetrically to each other.

FIG. 3 and FIG. 4 further illustrate a total of two gears 20, one provided per first rotating shaft 11, configured to intermesh, a total of two gears 21, one provided per first rotating shaft 11, configured to intermesh, as many E-rings 22 as required, and as many screws 23 as required.

FIG. 2 to FIG. 4 illustrate states in which the rotating shafts 10 are attached to the first housing 4 and the second housing 5, to which the display panel 2 is bonded, and to the hinge portion 6, and the rotating shafts 10 are passed through the corresponding holes 17, making each bearing structure 16 rotatable.

Figure 5:
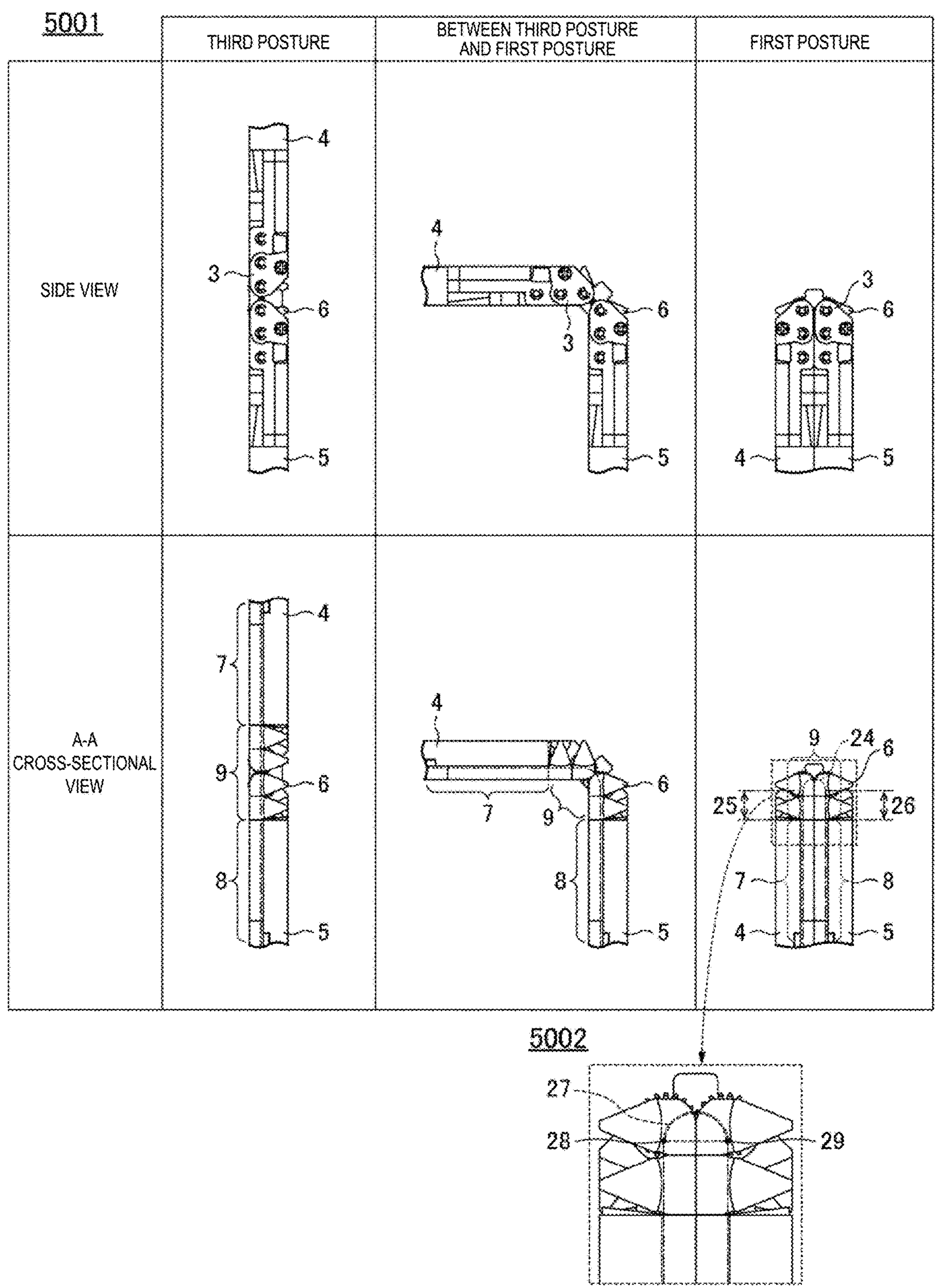
FIG. 5 illustrates side views and cross-sectional views taken along line A-A of the foldable display according to the disclosure, and is for describing a third posture, a posture between the third posture and a first posture, and the first posture.

FIG. 5 illustrates side views and cross-sectional views taken along line A-A (refer to FIG. 2) of the foldable display 101, and is for describing a third posture, a posture between the third posture and a first posture, and the first posture. In FIG. 5, reference numeral 5001 denotes a table, and reference numeral 5002 denotes a partially enlarged cross-sectional view of the first posture taken along line A-A.

The third portion 9, in a side view (of the third portion 9), includes a first arc portion 24, a first line segment portion 25, and a second line segment portion 26 in the first posture. A side surface of the third portion 9 is parallel to both a side surface and the cross section taken along line A-A of the foldable display 101.

The first arc portion 24 is an arc of a first semicircle 27 formed by a portion where the display panel 2 is bent. The first line segment portion 25 and the second line segment portion 26 are line segments starting from one end 28 and the other end 29 of the first arc portion 24, respectively. In the first posture, the third portion 9, in a side view thereof, is U-shaped or teardrop-shaped, for example.

Figure 6:
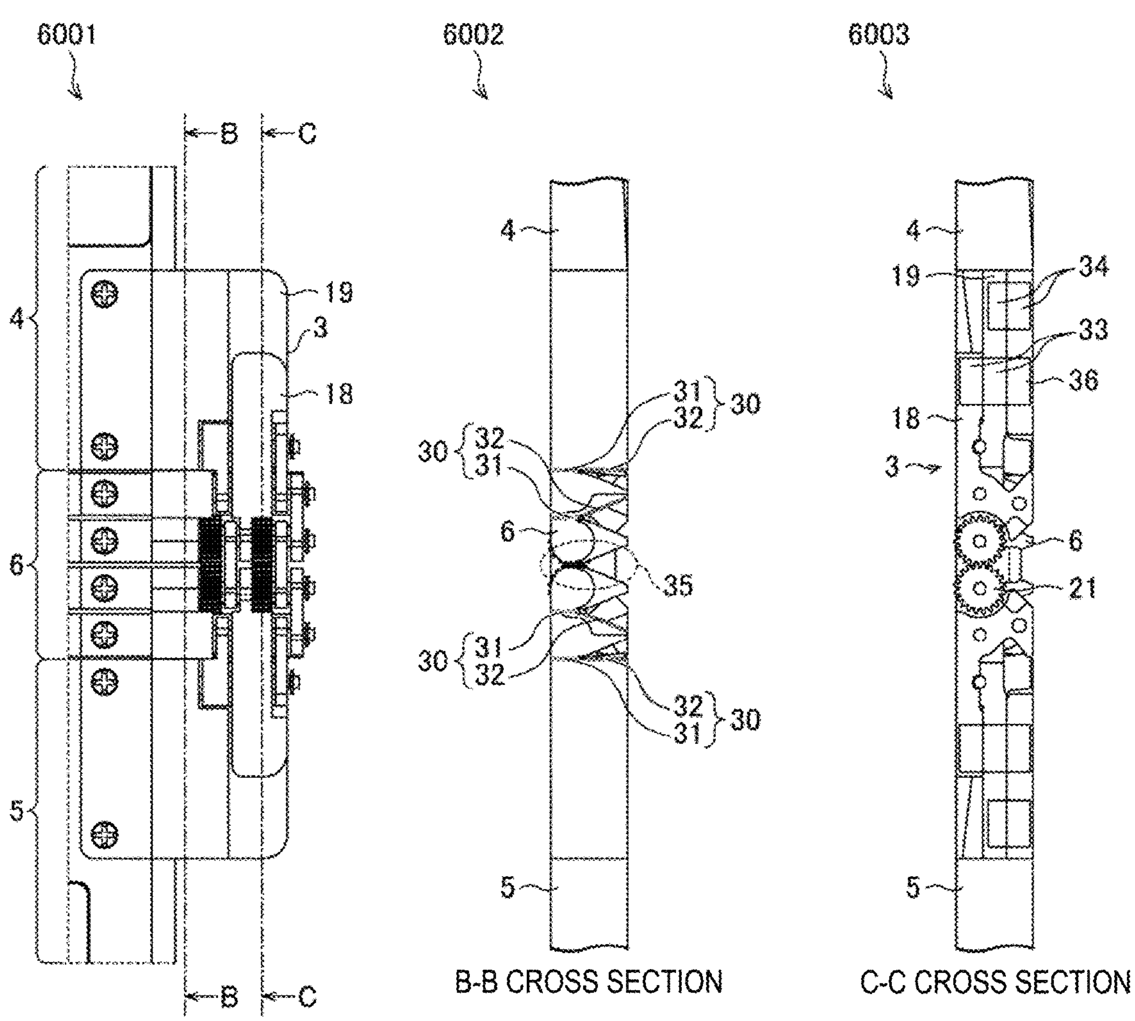
FIG. 6 is a view for describing a cross-sectional view taken along line B-B and a cross-sectional view taken along line C-C of the foldable display according to the disclosure.

FIG. 6 is a view for describing a cross-sectional view taken along line B-B and a cross-sectional view taken along line C-C of the foldable display 101. In FIG. 6, reference numeral 6001 denotes a plan view, reference numeral 6002 denotes the cross-sectional view taken along line B-B, and reference numeral 6003 denotes the cross-sectional view taken along line C-C.

The second rotating shaft accommodation member 15 includes an abutting portion 30 that can abut on the rotating shaft accommodation member 13 among the plurality of rotating shaft accommodation members 13 that is adjacent thereto. The abutting portion 30 includes a first abutting region 31 and a second abutting region 32.

The first abutting region 31 has an invariable angle of rotation about the second rotating shaft 12 between the first posture and the third posture. In FIG. 6, the second rotating shaft accommodation member 15 abuts on the rotating shaft accommodation member 13 among the plurality of rotating shaft accommodation members 13 that is adjacent thereto in the first abutting region 31 between the first posture and the third posture, thereby inhibiting rotation about the second rotating shaft 12.

The second abutting region 32 has a variable angle of rotation about the second rotating shaft 12 between the second posture and the third posture. The second abutting region 32 will be described below.

In the transition between the first posture and the third posture, rotation about the first rotating shaft 11 is performed, but rotation about the second rotating shaft 12 is not performed. Accordingly, one side rotates integrally with the two first rotating shaft accommodation members 14 interposed therebetween, and the other side rotates integrally with the two first rotating shaft accommodation members 14 interposed therebetween.

The bearing assembly 3 includes two first detachable members 33 that are detachable from each other. One of a combination of the bearing assembly 3 and the first housing 4 or a combination of the bearing assembly 3 and the second housing 5 includes two second detachable members 34 that are detachable from each other. In a side view of the foldable display 101, the two first detachable members 33 are provided on a side close to a center 35 of the hinge portion 6 in relation to the two second detachable members 34. Examples of the two first detachable members 33 include two magnets, and a set of one magnet (one of the two first detachable members 33) and one metal plate (the other of the two first detachable members 33). Examples of the two second detachable members 34 include two magnets, and a set of one magnet (one of the two second detachable members 34) and one metal plate (the other of the two second detachable members 34). The one metal plate attaches to the magnet, such as an iron plate.

In the foldable display 101, the third posture is defined in a state in which the two first detachable members 33 are attached to each other and the two second detachable members 34 are attached to each other.

The first blade portion 18 includes one of the two first detachable members 33 that are detachable from each other. The second blade portion 19 includes the other of the two first detachable members 33. One of a combination of the second blade portion 19 and the first housing 4 and a combination of the second blade portion 19 and the second housing 5 includes the two second detachable members 34 that are detachable from each other.

The two first detachable members 33 are provided at the first blade portion 18 and the second blade portion 19, respectively. Each of the two second detachable members 34 is respectively provided at one of the combination of the second blade portion 19 and the first housing 4 and the combination of the second blade portion 19 and the second housing 5.

At least one of first blade portion 18 and second blade portion 19 is rotatable with respect to one of the first housing 4 and the second housing 5 corresponding to at least one of the first blade portion 18 and the second blade portion 19 using at least one of the plurality of rotating shafts 10.

According to FIG. 6, the foldable display 101 includes two sets of the two first detachable members 33 and two sets of the two second detachable members 34. One set of the two second detachable members 34 is provided at the bearing assembly 3 (second blade portion 19) and the first housing 4. The other set of the two second detachable members 34 is provided at the bearing assembly 3 (second blade portion 19) and the second housing 5. Further, the foldable display 101 further includes two sets of detachable members 36. Examples of the detachable member 36 include a magnet and a metal plate (in a case in which the first detachable member 33 of the second blade portion 19 is a magnet). The metal plate attaches to the magnet, such as an iron plate.

Figure 7:
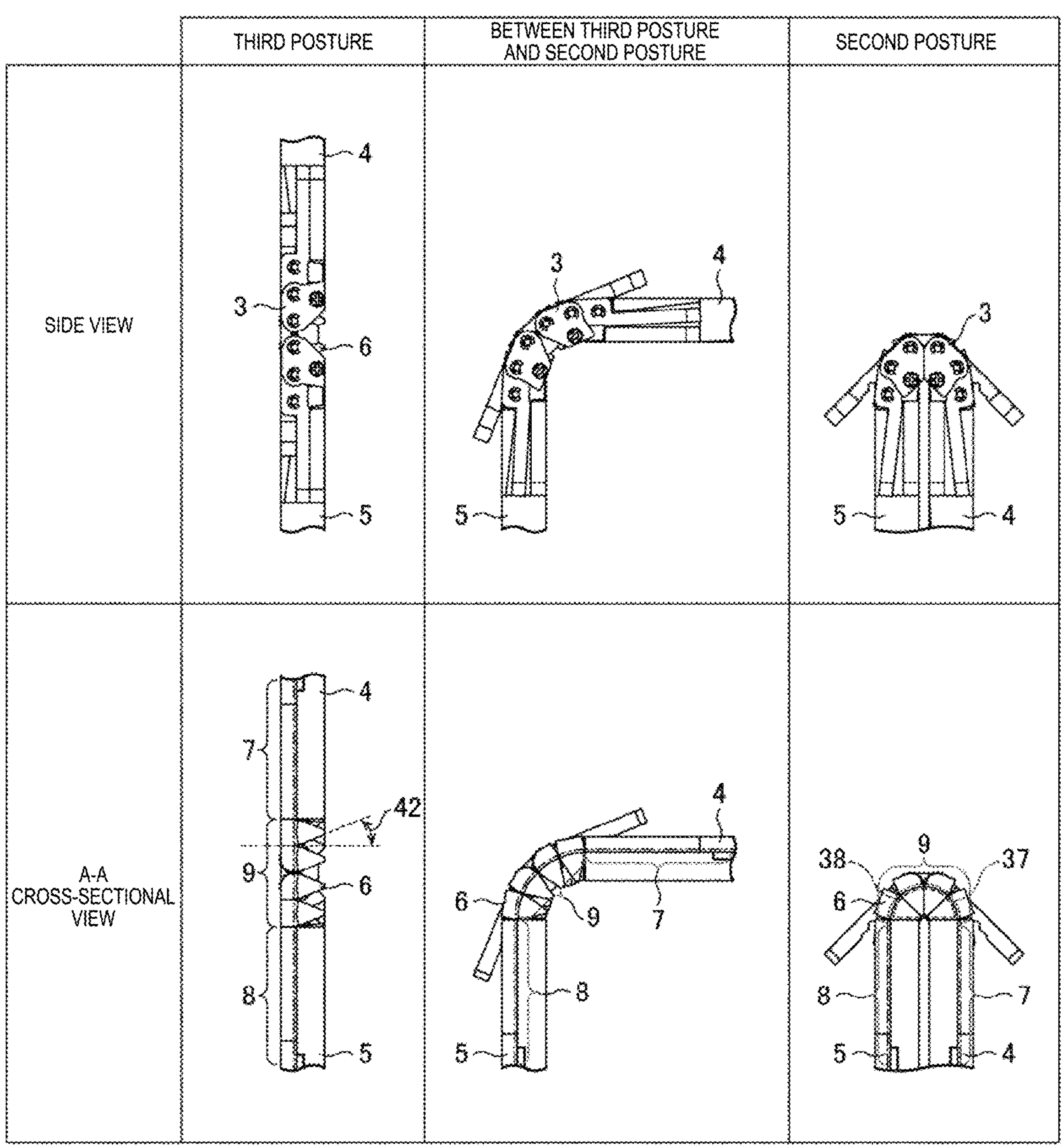
FIG. 7 illustrates side views and cross-sectional views taken along line A-A of the foldable display according to the disclosure, and is for describing the third posture, a posture between the third posture and a second posture, and the second posture.

FIG. 7 illustrates side views and cross-sectional views taken along line A-A (refer to FIG. 2) of the foldable display 101, and is for describing the third posture, a posture between the third posture and the second posture, and the second posture.

The third portion 9, in a side view (of the third portion 9), includes a second arc portion 37 in the second posture.

Figure 10:
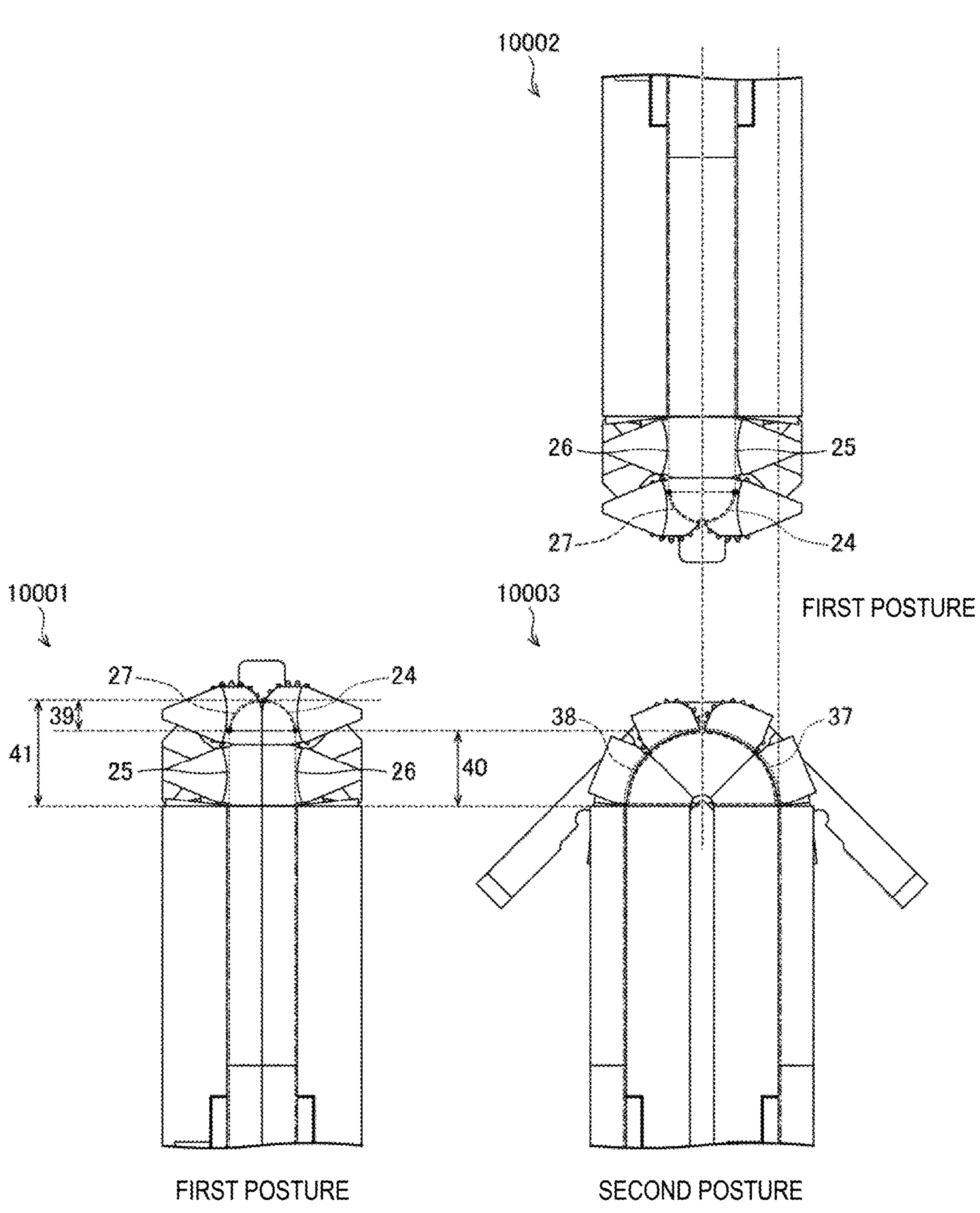
FIG. 10 is a view comparing the first posture and the second posture.

The second arc portion 37 is an arc of a second semicircle 38 formed by a portion where the display panel 2 is bent. FIG. 10 is a view comparing the first posture and the second posture. In FIG. 10, the two first postures are denoted by reference numerals 10001 and 10002, respectively, and the second posture is denoted by reference numeral 10003. A radius 40 of the second semicircle 38 is greater than a radius 39 of the first semicircle 27. In the second posture, the third portion 9 is semicircular in a side view thereof. In the third portion 9 of the foldable display 101, a sum 41 of the radius 39 of the first semicircle 27 and a length of the first line segment portion 25 or a length of the second line segment portion 26 is greater than the radius 40 of the second semicircle 38.

Figure 8:
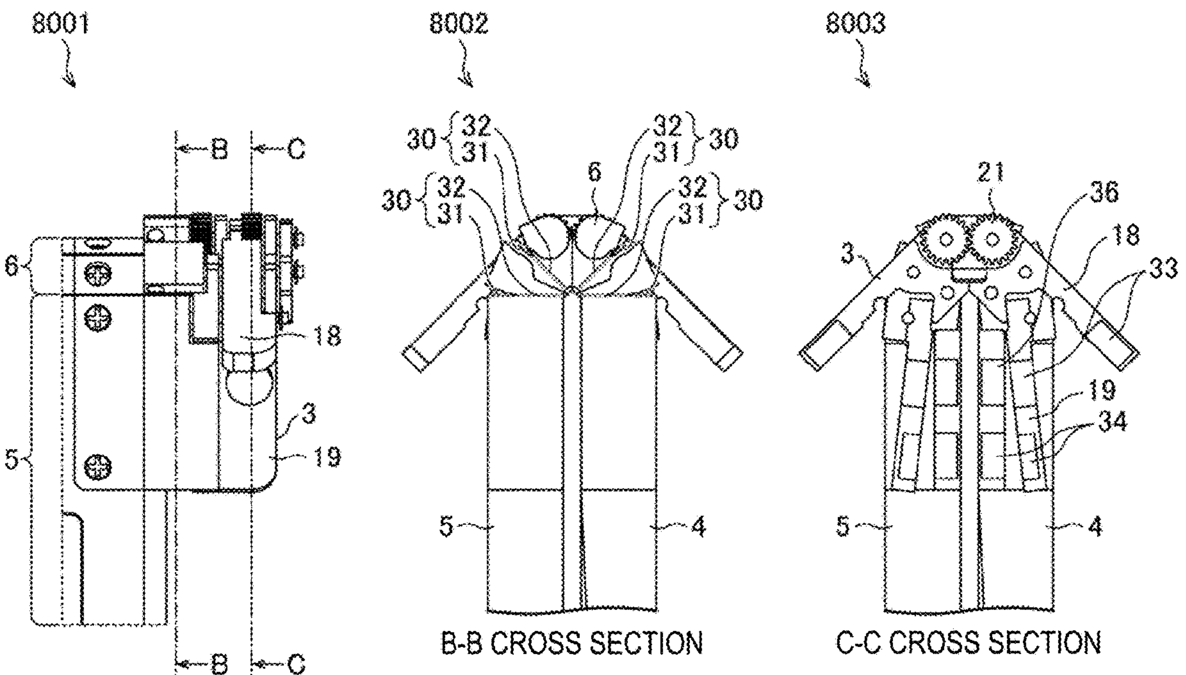
FIG. 8 is a view for describing a cross-sectional view taken along line B-B and a cross-sectional view taken along line C-C of the foldable display according to the disclosure.

FIG. 8 is a view for describing a cross-sectional view taken along line B-B and a cross-sectional view taken along line C-C of the foldable display 101. In FIG. 8, reference numeral 8001 denotes a plan view, reference numeral 8002 denotes a cross-sectional view taken along line B-B, and reference numeral 8003 denotes a cross-sectional view taken along line C-C.

In FIG. 8, the second rotating shaft accommodation member 15 is permitted to rotate about the second rotating shaft 12 in the transition from the third posture to the second posture. At this time, when an angle of rotation about the second rotating shaft 12 reaches a predetermined angle 42 illustrated in FIG. 7, the second rotating shaft accommodation member 15 abuts on the rotating shaft accommodation member 13 of the plurality of rotating shaft accommodation members 13 that is adjacent thereto in the second abutting region 32, thereby inhibiting rotation by an angle exceeding the predetermined angle 42.

The first rotating shaft accommodation member 14 also includes a structure having a function equivalent to that of the second abutting region 32. In a case in which the total number of the rotating shafts 10 is six, the display panel 2 can be bent by 180 degrees by setting the predetermined angle 42 to 22.5 degrees.

In the transition between the second posture and the third posture, rotation about the first rotating shaft 11 is performed, and rotation about the second rotating shaft 12 is further performed. As a result, rotation occurs for each of the rotating shaft accommodation member 13.

Figure 9:
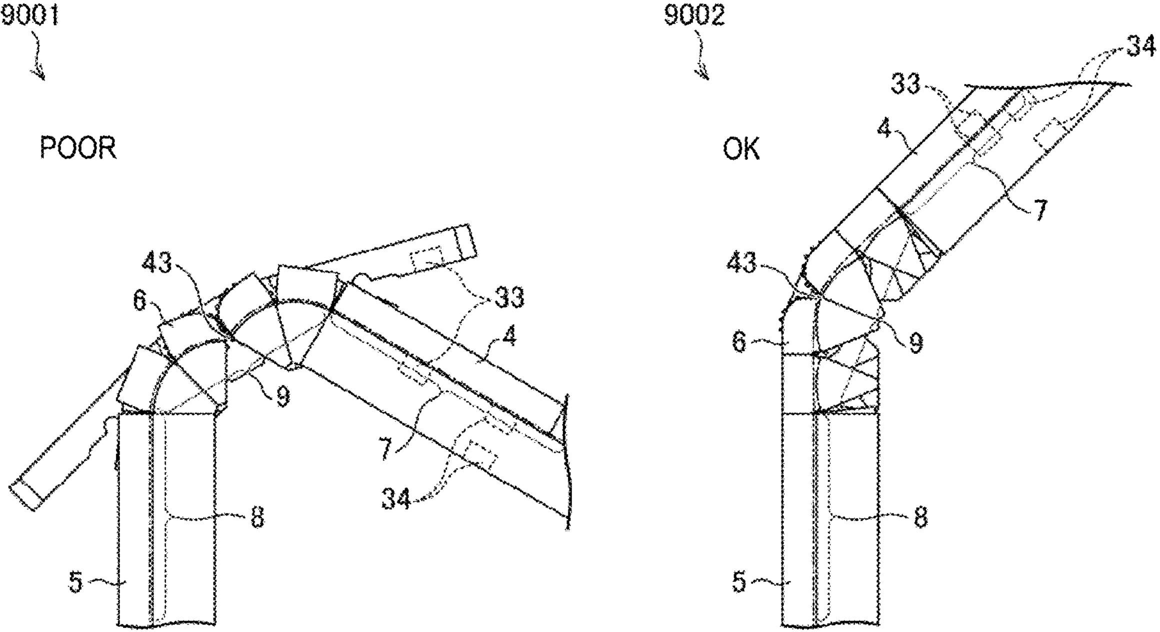
FIG. 9 is a view illustrating a timing at which two first detachable members are separated from each other and two second detachable members are separated from each other, and a timing at which the two first detachable members are attached to each other and the two second detachable members are attached to each other.

FIG. 9 is a view illustrating a timing at which the two first detachable members 33 are separated from each other and the two second detachable members 34 are separated from each other, and a timing at which the two first detachable members 33 are attached to each other and the two second detachable members 34 are attached to each other. In FIG. 9, a bad example is denoted by reference numeral 9001, and a good example is denoted by reference numeral 9002.

In the transition from the third posture to the second posture, the timing at which the two first detachable members 33 are separated from each other is earlier than the timing at which the two second detachable members 34 are separated from each other. Accordingly, in a side view of the foldable display 101, in the transition from the third posture to the second posture, the third portion 9 is bent starting from a side of the center 35 of the hinge portion 6.

In the transition from the second posture to the third posture, the timing at which the two first detachable members 33 attach to each other is later than the timing at which the two second detachable members 34 attach to each other. Accordingly, in a side view of the foldable display 101, in the transition from the second posture to the third posture, the bending of the third portion 9 is released starting from a side away from the center 35 of the hinge portion 6.

When the bending is started from a side away from the center 35 of the hinge portion 6 or the bending is released starting from the side of the center 35 of the hinge portion 6, a center 43 of the third portion 9 bends and the display panel 2 may incur significant damage. With the bending starting from the side of the center 35 of the hinge portion 6 and the release of the bending starting from the side away from the center 35 of the hinge portion 6, it is possible to prevent the bending of the center 43 of the third portion 9 and reduce damage to the display panel 2.

Supplement

The foldable display 101 is a display that is foldable in both directions without a length of the display panel 2 being changed. In the related art, the housing unit 1 is thick, and the length of the display panel 2 differs between the first posture and the second posture.

The foldable display 101 includes, for example, six rotating shafts 10 and a corresponding number of bearing structures 16.

In the first posture, rotation occurs by the first rotating shaft 11. The two first detachable members 33 and the two second detachable members 34 are provided so as to maintain a state in which the display panel 2 extends straight, in other words, so that the plurality of rotating shafts 10 does not rotate separately from one another.

In the second posture, the display panel 2 can be bent by 180 degrees by rotation by 22.5 degrees for each of the six rotating shafts 10. To achieve this, the second abutting region 32 is provided.

The center 43 of the third portion 9 is opened last so that the display panel 2 does not fold at the center 43 of the third portion 9. The two second detachable members 34 attach before the two first detachable members 33, preventing the display panel 2 from being folded.

The first semicircle 27 and the second semicircle 38 have different radii. Further, the number of the rotating shafts 10 that rotate changes between the first posture and the second posture.

The second abutting region 32 is beneficial for uniform bending. To ensure that excessive bending does not occur at a particular location, rotation about the corresponding rotating shaft 10 is stopped within a design range.

In Transition Between First Posture and Third Posture

With the two first rotating shafts 11, rotation by two shafts is performed in synchronization by the two gears 20.

The display panel 2 is bonded to the first housing 4 and the second housing 5, and is not bonded to any part of the housing unit 1. Thus, in transition from the third posture to the first posture, no difference occurs between a total length of the display panel 2 and a total length of the housing unit 1. Each of the two first rotating shaft accommodation members 14 is fixed to the corresponding gear among the two gears 20.

The foldable display 101 includes the six rotating shafts 10 to realize the first posture and the second posture. In the transition between the second posture and the third posture, each of the six rotating shafts 10 rotates, but in the transition between the first posture and the third posture, only the first rotating shafts 11 rotate. In the transition between the first posture and the third posture, to ensure that the second rotating shafts 12 do not rotate, the first abutting regions 31 are provided.

In Transition Between Second Posture and Third Posture

Each of the six rotating shaft accommodation members 13 bends in 22.5 degree increments, realizing the 180-degree bending of the display panel 2. At this time, the shafts are arranged at positions close to the display panel 2 so that there is no difference between the total length of the housing unit 1 and the total length of the display panel 2.

For the rotating shafts 10, virtual shafts may be set in the same positions using cams or the like, rather than using shafts and bearings.

The rotation of each rotating shaft accommodation member 13 needs to stop every 22.5 degrees (in the case of six shafts) in the second posture, and thus the second abutting regions 32 are provided. Three of the six rotating shafts 10 on the first housing 4 side are coupled to the first blade portion 18 and the second blade portion 19, and move to a position of 22.5 degrees relative to the first housing 4.

Two sets of the first blade portions 18 are provided symmetrically, and the two first blade portions 18 are synchronized with each other by the gears 21. Synchronization may be provided between the two (two sets of symmetrical) second blade portions 19 or between all members of the bearing assembly 3.

Note that each of the first detachable members 33 and the second detachable members 34 may be replaced with a link or the like. Further, magnets may be provided in the first abutting regions 31 facing each other, and the magnets may be attached to each other in the third posture and may be separated from each other in the second posture.

Supplement

A foldable display according to a first aspect of the disclosure includes a housing unit including a first housing, a second housing, and a hinge portion coupling the first housing and the second housing, and a display panel having flexibility and including a first portion fixed to the first housing, a second portion fixed to the second housing, and a third portion positioned between the first portion and the second portion. The third portion includes, in a side view, in a first posture of the display panel being bent, bringing the display panel inside the housing unit, a first arc portion that is an arc of a first semicircle formed by a bent portion of the display panel, and a first line segment portion and a second line segment portion respectively starting from one end and the other end of the first arc portion, and, in a second posture of the display panel being bent, bringing the display panel outside the housing unit, a second arc portion that is an arc of a second semicircle formed by a bent portion of the display panel and having a radius greater than a radius of the first semicircle.

According to a second aspect of the disclosure, in the foldable display according to the first aspect, at least the hinge portion of the housing unit includes a plurality of rotating shafts configured to allow bending of the display panel, and the plurality of rotating shafts includes a first rotating shaft configured to contribute to both a bending of the display panel in the first posture and a bending of the display panel in the second posture, and a second rotating shaft configured not to contribute to the bending of the display panel in the first posture and configured to contribute to the bending of the display panel in the second posture.

According to a third aspect of the disclosure, in the foldable display according to the second aspect, at least the hinge portion of the housing unit includes a plurality of rotating shaft accommodation members each accommodating a corresponding one of the plurality of rotating shafts, the plurality of rotating shaft accommodation members includes a first rotating shaft accommodation member accommodating the first rotating shaft, and a second rotating shaft accommodation member accommodating the second rotating shaft, the second rotating shaft accommodation member includes an abutting portion configured to abut on an adjacent rotating shaft accommodation member of the plurality of rotating shaft accommodation members, and the abutting portion includes a first abutting region having an invariable angle of rotation about the second rotating shaft between the first posture and a third posture of the display panel not being bent, and a second abutting region having a variable angle of rotation about the second rotating shaft between the second posture and the third posture.

According to a fourth aspect of the disclosure, the foldable display according to the second aspect further includes a bearing assembly configured to support the plurality of rotating shafts.

According to a fifth aspect of the disclosure, in the foldable display according to the fourth aspect, the bearing assembly is configured to fix relative positions of two adjacent rotating shaft of the plurality of rotating shafts.

According to a sixth aspect of the disclosure, in the foldable display according to the fourth aspect, the bearing assembly includes a first area including one of two first detachable members detachable from each other, and a second area including the other of the two first detachable members, one of a combination of the second area and the first housing and a combination of the second area and the second housing includes two second detachable members detachable from each other, and, in a side view of the foldable display, the two first detachable members are provided on a side close to a center of the hinge portion in relation to the two second detachable members.

According to a seventh aspect of the disclosure, in the foldable display according to the sixth aspect, at least one of the first area and the second area is rotatable with respect to one of the first housing and the second housing corresponding thereto using at least one of the plurality of rotating shafts.

According to an eighth aspect of the disclosure, in the foldable display according to the sixth aspect, a third posture of the display panel not being bent is defined in a state in which the two first detachable members are attached to each other and the two second detachable members are attached to each other.

According to a ninth aspect of the disclosure, in the foldable display according to the eighth aspect, in transition from the third posture to the second posture, a timing at which the two first detachable members are separated from each other is earlier than a timing at which the two second detachable members are separated from each other.

According to a tenth aspect of the disclosure, in the foldable display according to the eighth aspect, in transition from the second posture to the third posture, a timing at which the two first detachable members are attached to each other is later than a timing at which the two second detachable members are attached to each other.

According to an eleventh aspect of the disclosure, in the foldable display according to the sixth aspect, the bearing assembly includes a first blade portion as the first area rotatable about the first rotating shaft, and a second blade portion as the second area rotatable about the second rotating shaft, the two first detachable members are respectively provided at the first blade portion and the second blade portion, and the two second detachable members are respectively provided at one of a combination of the second blade portion and the first housing and a combination of the second blade portion and the second housing.

According to a twelfth aspect of the disclosure, in the foldable display according to the first aspect, in the third portion, a sum of a radius of the first semicircle and a length of the first line segment portion or a length of the second line segment portion is greater than a radius of the second semicircle.

According to a thirteenth aspect of the disclosure, in the foldable display according to the first aspect, the third portion, in a side view of the foldable display is configured to bend starting from a side of a center of the hinge portion in transition from a third posture of the display panel not being bent to the second posture.

According to a fourteenth aspect of the disclosure, in the foldable display according to the first aspect, the third portion, in a side view of the foldable display is configured to be released from being bent starting from a side away from a center of the hinge portion in transition from the second posture to a third posture of the display panel not being bent.

According to a fifteenth aspect of the disclosure, in the foldable display according to the first aspect, the third portion is indirectly fixed to the housing unit.

The disclosure is not limited to the embodiments described above, and various modifications may be made within the scope of the claims. Embodiments obtained by appropriately combining technical approaches disclosed in the different embodiments also fall within the technical scope of the disclosure. Furthermore, novel technical features can be formed by combining the technical approaches disclosed in each of the embodiments.

The invention claimed is:

1. A foldable display comprising:

a housing unit including a first housing, a second housing, and a hinge portion coupling the first housing and the second housing; and a display panel having flexibility and including a first portion fixed to the first housing, a second portion fixed to the second housing, and a third portion positioned between the first portion and the second portion, wherein the third portion includes, in a side view, in a first posture of the display panel being bent, bringing the display panel inside the housing unit, a first arc portion that is an arc of a first semicircle formed by a bent portion of the display panel, and a first line segment portion and a second line segment portion respectively starting from one end and the other end of the first arc portion, and in a second posture of the display panel being bent, bringing the display panel outside the housing unit, a second arc portion that is an arc of a second semicircle formed by a bent portion of the display panel and having a radius greater than a radius of the first semicircle, wherein at least the hinge portion of the housing unit includes a plurality of rotating shafts configured to allow bending of the display panel, and the plurality of rotating shafts includes a first rotating shaft configured to contribute to both bending of the display panel in the first posture and bending of the display panel in the second posture, and a second rotating shaft configured not to contribute to the bending of the display panel in the first posture and configured to contribute to the bending of the display panel in the second posture.

2. The foldable display according to claim 1, wherein at least the hinge portion of the housing unit includes a plurality of rotating shaft accommodation members each accommodating a corresponding one of the plurality of rotating shafts, the plurality of rotating shaft accommodation members includes a first rotating shaft accommodation member accommodating the first rotating shaft, and a second rotating shaft accommodation member accommodating the second rotating shaft, the second rotating shaft accommodation member includes an abutting portion configured to abut on an adjacent rotating shaft accommodation member of the plurality of rotating shaft accommodation members, and the abutting portion includes a first abutting region having an invariable angle of rotation about the second rotating shaft between the first posture and a third posture of the display panel not being bent, and a second abutting region having a variable angle of rotation about the second rotating shaft between the second posture and the third posture.

3. The foldable display according to claim 1, comprising:

a bearing assembly supporting the plurality of rotating shafts.

4. The foldable display according to claim 3, wherein the bearing assembly fixes relative positions of two adjacent rotating shafts of the plurality of rotating shafts.

5. The foldable display according to claim 3, wherein the bearing assembly includes a first area including one of two first detachable members detachable from each other, and a second area including the other of the two first detachable members, one of a combination of the second area and the first housing and a combination of the second area and the second housing includes two second detachable members detachable from each other, and in a side view of the foldable display, the two first detachable members are provided on a side close to a center of the hinge portion in relation to the two second detachable members.

6. The foldable display according to claim 5, wherein at least one of the first area and the second area is rotatable with respect to one of the first housing and the second housing corresponding to the at least one of the first area and the second area using at least one of the plurality of rotating shafts.

7. The foldable display according to claim 5, wherein a third posture of the display panel not being bent is defined in a state in which the two first detachable members are attached to each other and the two second detachable members are attached to each other.

8. The foldable display according to claim 7, wherein, in transition from the third posture to the second posture, a timing at which the two first detachable members are separated from each other is earlier than a timing at which the two second detachable members are separated from each other.

9. The foldable display according to claim 7, wherein, in transition from the second posture to the third posture, a timing at which the two first detachable members are attached to each other is later than a timing at which the two second detachable members are attached to each other.

10. The foldable display according to claim 5, wherein the bearing assembly includes a first blade portion as the first area rotatable about the first rotating shaft, and a second blade portion as the second area rotatable about the second rotating shaft, the two first detachable members are respectively provided at the first blade portion and the second blade portion, and the two second detachable members are respectively provided at a combination of the second blade portion and the first housing and a combination of the second blade portion and the second housing.

11. The foldable display according to claim 1, wherein, in the third portion, a sum of a radius of the first semicircle and a length of the first line segment portion or a length of the second line segment portion is greater than a radius of the second semicircle.

12. The foldable display according to claim 1, wherein the third portion, in a side view of the foldable display, is configured to bend starting from a side of a center of the hinge portion in transition from a third posture of the display panel not being bent to the second posture.

13. The foldable display according to claim 1, wherein the third portion, in a side view of the foldable display, is configured to be released from being bent starting from a side away from a center of the hinge portion in transition from the second posture to a third posture of the display panel not being bent.

14. The foldable display according to claim 1, wherein the third portion is indirectly fixed to the housing unit.

* * * * *